US009826497B2

(12) United States Patent
Doh et al.

(10) Patent No.: US 9,826,497 B2
(45) Date of Patent: Nov. 21, 2017

(54) METHOD AND SYSTEM FOR DETERMINING WHETHER BEACON DEVICE IS ABNORMAL

(71) Applicant: SK Planet Co., Ltd., Seongnam-si, Gyeonggi-do (KR)

(72) Inventors: Hyun Oh Doh, Seoul (KR); Jae Hyung Huh, Seongnam-si (KR)

(73) Assignee: SK PLANET CO., LTD., Seongnam-si (KR)

( * ) Notice: Subject to any disclaimer, the term of this patent is extended or adjusted under 35 U.S.C. 154(b) by 215 days.

(21) Appl. No.: 14/548,680

(22) Filed: Nov. 20, 2014

(65) Prior Publication Data
US 2016/0044521 A1 Feb. 11, 2016

(30) Foreign Application Priority Data
Aug. 8, 2014 (KR) .................... 10-2014-0102526

(51) Int. Cl.
*H04W 64/00* (2009.01)
*H04W 24/04* (2009.01)

(52) U.S. Cl.
CPC .......... *H04W 64/00* (2013.01); *H04W 24/04* (2013.01)

(58) Field of Classification Search
CPC .............. H04W 24/04; H04W 40/246; H04W 52/0216; H04W 52/0229; H04W 16/20; H04W 24/02; H04W 24/08; H04W 28/00; H04W 4/04; H04W 4/22; H04W 64/00; H04L 41/0668; H04L 41/12
USPC ............................................. 370/242; 706/46
See application file for complete search history.

(56) References Cited

U.S. PATENT DOCUMENTS

| 2014/0055266 A1* | 2/2014 | Valiulis .............. G08B 13/1481 340/572.1 |
| 2014/0089243 A1* | 3/2014 | Oppenheimer ......... G06F 21/50 706/46 |
| 2016/0093182 A1* | 3/2016 | Turgeon ............. G08B 13/2448 340/572.1 |

* cited by examiner

*Primary Examiner* — Marsha D. Banks Harold
*Assistant Examiner* — Natasha W Cosme
(74) *Attorney, Agent, or Firm* — Stein IP, LLC (57) ABSTRACT

A method and system for determining whether a beacon device is abnormal using a service server are disclosed herein. The service server includes an approach information reception unit, a pattern information generation unit, and a detection unit. The approach information reception unit receives approach information related to any one of a plurality of beacon devices from a user terminal over a network. The pattern information generation unit generates pattern information about a pattern in which the user terminal approaches the plurality of beacon devices based on a plurality of pieces of approach information received from a plurality of user terminals. The detection unit determines whether any one of the plurality of beacon devices is abnormal based on a change in the pattern information generated by the pattern information generation unit.

10 Claims, 4 Drawing Sheets

METHOD AND SYSTEM FOR DETERMINING WHETHER BEACON DEVICE IS ABNORMAL

CROSS-REFERENCE TO RELATED APPLICATION

This application claims the benefit of Korean Patent Application No. 10-2014-0102526, filed Aug. 8, 2014, which is hereby incorporated by reference herein in its entirety.

BACKGROUND OF THE INVENTION

1. Technical Field

The present disclosure relates generally to a method and system for determining whether a beacon device is abnormal and, more particularly, to technology that is capable of determining whether a beacon device is abnormal via a plurality of beacon devices configured to be installed in a shop, via a user terminal configured to receive beacon signals from the plurality of beacon devices, and via a service server configured to receive approach information related to the plurality of beacon devices from the user terminal.

2. Description of the Related Art

With the advancements of mobile communication technology and user terminal-hardware and software technology, services that can push various types of information into user terminals have been provided. As an example of the services that can be provided to user terminals, a service in which a beacon device is installed in a shop, the location information of user terminals is obtained and then content suitable for the corresponding shop is provided to the user terminals has appeared.

A typical beacon service is briefly described below. When at least one beacon device configured to output a signal (hereinafter referred to as a beacon signal) containing the location information of a shop is installed in the shop and a user terminal is located in the shop and identifies the beacon signal, the user terminal transmits approach information related to the beacon device to a service server configured to provide beacon service over a mobile communication network, and the service server determines the current location of the user terminal and then provides various types of content, such as an advertisement, a coupon, and the accumulation of points.

Meanwhile, a situation in which the output strength of a beacon signal decreases or a beacon signal cannot be output may occur due to the failure of a beacon device or the exhaustion of a battery. Since the beacon device that is used to provide beacon service cannot connect to a separate network, corresponding information cannot be transmitted to the service server if the beacon device is abnormal. In this case, in order to determine whether the beacon device is abnormal, an administrator should directly determine whether the beacon device is abnormal offline.

This conventional technology is problematic in that, when an unexpected abnormality occurs in a beacon device, it is impossible to immediately determine whether the beacon device is abnormal, although a shop owner who has subscribed to the beacon service and the user of the user terminal suffer losses.

Meanwhile, the above descriptions of the related art are intended to promote the understanding of the background of the present invention, and should not be construed in any way as an admission as to prior art already known to those skilled in the art.

SUMMARY OF THE INVENTION

At least some embodiments of the present invention are directed to the provision of a service server that accumulates approach information related to a beacon device received from a user terminal, generates a pattern, and then determines whether the beacon device is abnormal based on a change in the pattern, thereby determining whether the beacon device is abnormal through the analysis of pattern information on a server side without directly checking the beacon device, and a method and system for determining whether a beacon device is abnormal using the service server.

In accordance with an aspect of the present invention, there is provided a service server for determining whether a beacon device is abnormal, the service server including an approach information reception unit configured to receive approach information related to any one of a plurality of beacon devices from a user terminal over a network; a pattern information generation unit configured to generate pattern information about a pattern in which the user terminal approaches the plurality of beacon devices, based on a plurality of pieces of approach information received from a plurality of user terminals; and a detection unit configured to determine whether any one of the plurality of beacon devices is abnormal based on a change in the pattern information generated by the pattern information generation unit.

In the service server, the pattern information may include information about a pattern of the beacon devices that the user terminal sequentially approaches; and the detection unit may be further configured to determine whether any one of the plurality of beacon devices is abnormal based on a change in the pattern of the beacon devices that the user terminal sequentially approaches.

In the service server, the detection unit may be further configured to determine that a second one of the plurality of beacon devices is abnormal if it is determined based on the pattern information that a rate at which the user terminal approaches a first one of the plurality of beacon devices and then approaches the second one has decreased to or below a predetermined rate.

In the service server, the pattern information may include information about a frequency at which the user terminal approaches each of the beacon devices; and the detection unit may be further configured to determine whether any one of the plurality of beacon devices is abnormal based on a reduction in a frequency at which the user terminal approaches the corresponding beacon device.

In the service server, the pattern information generation unit may be further configured to generate the pattern information based on an approach frequency related to each of the beacon devices in each time span; and the detection unit may be further configured to determine that a beacon device whose approach frequency in each time span has decreased at a predetermined or higher rate is abnormal.

In the service server, the pattern information generation unit may be further configured to generate the pattern information for each group classified based on user information of the user terminals.

The service server may further include a database unit configured to accumulate and store the pattern information generated by the pattern information generation unit.

The service server may further include a notification unit configured to notify an administrator terminal, which manages the abnormal beacon device, that any one of the plurality of beacon devices is abnormal if it is determined that the corresponding beacon device is abnormal.

In accordance with another aspect of the present invention, there is provided a method of determining whether a beacon device is abnormal, the method including receiving approach information related to any one of a plurality of beacon devices from a user terminal over a network; generating pattern information about a pattern in which the user terminal approaches the plurality of beacon devices based on a plurality of pieces of approach information received from a plurality of user terminals; and determining whether any one of the plurality of beacon devices is abnormal based on a change in the generated pattern information.

In the method, the pattern information may include information about a pattern of the beacon devices that the user terminal sequentially approaches; and determining whether any one of the beacon devices is abnormal may include determining whether any one of the plurality of beacon devices is abnormal based on a change in the pattern of the beacon devices that the user terminal sequentially approaches.

In the method, determining whether any one of the beacon devices is abnormal may further include determining that a second one of the plurality of beacon devices is abnormal if it is determined based on the pattern information that a rate at which the user terminal approaches a first one of the plurality of beacon devices and then approaches the second one has decreased to or below a predetermined rate.

In the method, the pattern information may include information about a frequency at which the user terminal approaches each of the beacon devices; and determining whether any one of the plurality of beacon devices is abnormal may include determining whether any one of the plurality of beacon devices is abnormal based on a reduction in the frequency at which the user terminal approaches the corresponding beacon device.

In the method, generating the pattern information may include generating the pattern information based on the approach frequency related to each of the beacon devices in each time span; and determining whether any one of the plurality of beacon devices is abnormal further may include determining that a beacon device whose approach frequency in each time span has decreased at a predetermined or higher rate is abnormal.

The method may further include notifying an administrator terminal, which manages the abnormal beacon device, that any one of the beacon devices is abnormal if it is determined that the corresponding device is abnormal.

In accordance with still another aspect of the present invention, there is provided a system for determining whether a beacon device is abnormal, the system including a plurality of beacon devices located at fixed locations and configured to output beacon signals; at least one user terminal configured to generate approach information related to each of the plurality of beacon devices, and to transmit the approach information to a service server over a network when receiving a beacon signal output from the beacon device; and the service server configured to generate pattern information about a pattern in which the user terminal approaches the plurality of beacon devices based on a plurality of pieces of approach information received from a plurality of user terminals, and to determine whether any one of the plurality of beacon devices is abnormal based on a change in the generated pattern information.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE EMBODIMENTS

The terminology used herein is merely used to illustrate specific embodiments, and is not intended to limit the technical spirit of the invention. Unless otherwise defined, all the terms used herein have the same meanings as commonly understood by those having ordinary knowledge in the technical field to which the present invention pertains, but should not be interpreted as having excessively comprehensive meanings nor as having excessively restricted meanings. If one or more technical terms used herein are erroneous and fail to accurately describe the technical spirit of the present invention, they should be replaced with technical terms that enable those having ordinary knowledge to appropriately understand the technical spirit of the invention. The general terms used herein should be interpreted based on the definitions of dictionaries or in the context thereof, but should not be interpreted as having excessively restricted meanings.

Embodiments of the present invention will be described in detail below with reference to the accompanying drawings. The same reference numerals will be assigned to the same or like components throughout the drawings, and descriptions of the same or like components will be omitted. In the following description of the present invention, detailed descriptions of related well-known technologies that are deemed to make the gist of the present invention obscure will be omitted. Furthermore, the accompanying drawings will be provided to enable the spirit of the present invention to be easily understood, and should not be interpreted as limiting the spirit of the present invention. Accordingly, it should be appreciated that the technical spirit of the present invention can extend to all variations, equivalents and replacements, in addition to the accompanying drawings.

Figure 1:
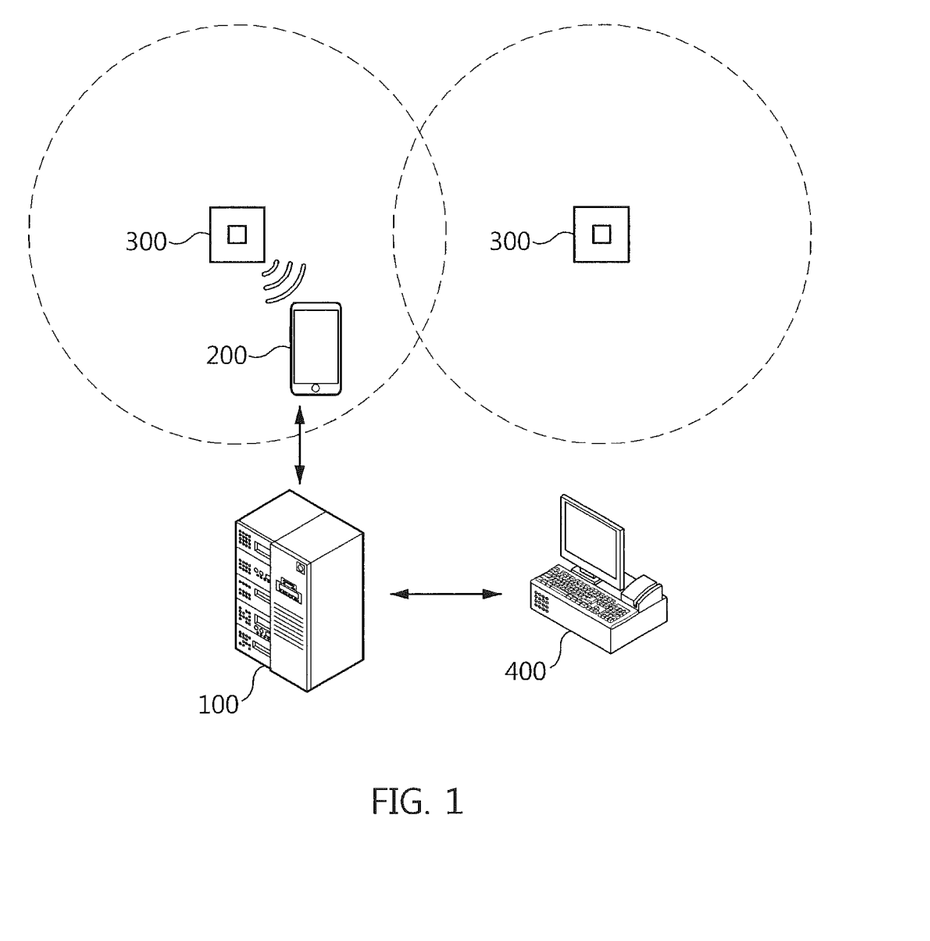
FIG. 1 is a schematic view illustrating a beacon service system according to an embodiment of the present invention.

FIG. 1 is a schematic view illustrating a beacon service system according to an embodiment of the present invention.

As illustrated in FIG. 1, the beacon service system according to this embodiment of the present invention may include a plurality of beacon devices 300, a user terminal 200, a service server 100, and an administrator terminal 400. The technical spirit of the present invention for determining whether the beacon device 300 is abnormal is described in detail below. However, descriptions of well-known technologies that belong to the features of devices for implementing beacon service are omitted.

Each of the plurality of beacon devices 300 may be located in a space within a shop. The plurality of beacon devices may be located inside a shop. Each of the plurality of beacon devices 300 outputs a beacon signal including its identification information. In this case, the identification information may include the Universally Unique Identifier (UUID) of the beacon device 300.

The beacon signal may be based on a well-known communication protocol, such as Bluetooth, ZigBee or Wi-Fi. In particular, a Bluetooth Low Energy (BLE) signal may be used as the beacon signal. The beacon signal output from the beacon device 300 can cover an area that is located within a radius of several meters to several tens of meters around the location of the beacon device 300. The plurality of beacon devices 300 may be located at intervals that allow the coverage areas of the beacon devices 300 to partially overlap each other.

Furthermore, the plurality of beacon devices 300 may be located in a plurality of shops when the plurality of shops is located in a building, as in a shopping center or mall. In this case, the output strength of beacon signals may be appropriately adjusted based on the distances between the beacon devices 300. When the user terminal 200 enters the coverage area of the beacon device 300, the user terminal 200 can identify the beacon signal of the corresponding beacon device 300. Accordingly, the cases where the user terminal 200 receives a plurality of beacon signals at the same location can be minimized.

Meanwhile, in order to implement the technical spirit of the present invention, the beacon devices 300 neither need to transmit or receive signals to or from each other, nor do they need to perform bidirectional communication with the user terminal 200 other than outputting beacon signals, nor do they need to be configured to connect to a wired/wireless network and exchange data with the service server 100.

The user terminal 200 may be implemented as a well-known device that may be carried by a user and that includes a microprocessor and internal memory and thus performs operation and storage processing, such as a smartphone, a tablet PC or a Personal Digital Assistant (PDA). The user terminal 200 includes a communication module capable of receiving beacon signals, for example, a Bluetooth communication module. For beacon service, the user terminal 200 may be equipped with at least one application or platform that is provided by the service server 100 or a server of another beacon service provider or the like.

When the user terminal 200 enters the coverage area of the beacon device 300 and receives a beacon signal, the user terminal 200 transmits approach information to the service server 100 over a network after executing a beacon-related application. In this case, the approach information is information indicative that the user terminal 200 has received the beacon signal from the corresponding beacon device 300. The approach information may include the identification information of the beacon device 300 (for example, the UUID of the beacon device 300), the time at which the beacon signal was received, and the identification information of the user terminal 200. In this case, the identification number of the user terminal 200 may include at least one of the International Mobile Station Equipment Identity (IMEI) of the user terminal 200, the E.164 number of a subscriber and the membership ID of the beacon application.

Meanwhile, the beacon application is executed in a background and not exposed to a user while the user terminal 200 is transmitting the approach information after receiving the beacon signal. Thereafter, when the user terminal 200 receives a push message from the service server 100, the beacon application may be executed in a foreground and provide content included in the push message to the user.

The administrator terminal 400 corresponds to a terminal that is possessed by an administrator who manages the beacon device 300. The administrator terminal 400 may be implemented as a portable terminal, such as a smartphone corresponding to the user terminal 200, or as a Personal Computer (PC) or the like. As will be described below, the administrator terminal 400 may receive related information from the service server 100 when any one of the beacon devices 300 is abnormal, and may provide the corresponding information to the administrator through the output of video or audio.

The service server 100 may communicate with a plurality of user terminals 200 over the network, may receive approach information from the user terminals 200, and may provide various services in response to the reception of the approach information. For example, the service server 100 may issue a coupon available in the shop where the user terminal 200 is located, may accumulate points in conjunction with a Point Of Sale (POS) system in the shop, or may provide descriptions of products sold in the corresponding shop or advertisements for related products. For this purpose, the service server 100 may organize the approach information received from the user terminals 200 into a database, and then may collect and store various types of information, such as the movement patterns, purchase patterns and preferred products of users. Furthermore, services with which the service server 100 may provide the user terminals 200 are not limited, and may include various well-known services based on the approach information.

In accordance with this embodiment of the present invention, the service server 100 may perform the process of determining whether the beacon device 300 is abnormal. As described above, since the beacon device 300 outputs a beacon signal depending on the power of a mounted battery, the output strength of the beacon signal may be weakened when the battery has been nearly exhausted, and thus the predetermined coverage area of the beacon signal may be reduced. Although the time at which the battery will be exhausted can be predicted, the beacon device 300 may reach a disabled state before an expected time due to the difference in temperature, humidity or the like, and the failure of the beacon device 300 may occur due to factors other than the exhaustion of a battery.

As described above, if the beacon device 300 is abnormal and the coverage area of the beacon signal has changed, the user terminal 200 may not receive the beacon signal, which may cause a failure to the provision of beacon service.

In accordance with the prior art, in a situation in which the beacon device 300 is not connected to a separate network, an administrator should directly determine whether the beacon device 300 is abnormal. In contrast, in accordance with this embodiment of the present invention, an administrator may determine whether the beacon device 300 is abnormal based on the information of a database and specific logic on a service server side.

For this purpose, the service server 100 may receive approach information from a plurality of user terminals 200, may generate pattern information about a pattern in which the user terminals 200 approach the plurality of beacon devices 300 based on the approach information. Thereafter, if an abnormal change in the pattern information has occurred, it may be determined that any one of the beacon devices 300 is abnormal.

More specifically, in a typical situation in which the user terminal 200 transmits approach information in sequence while the user terminal 200 is sequentially approaching a first beacon device 300, a second beacon device 300 and a third beacon device 300, if, after the approach information related to the first beacon device 300 had been transmitted, the transmission rate of approach information related to the second beacon device 300 has decreased and then the transmission rate of approach information related to the third beacon device 300 has increased, it may be determined that the second beacon device 300 is abnormal.

Furthermore, if the frequency at which a plurality of user terminals 200 transmits approach information related to a specific beacon device 300 is constant in a specific time span and then suddenly decreases, it may be determined that the corresponding beacon device 300 is abnormal.

The features of the devices of the system according to this embodiment of the present invention have been briefly described above. Specific embodiments of the present invention are described in detail below with reference to FIGS. 2 to 5.

Figure 2:
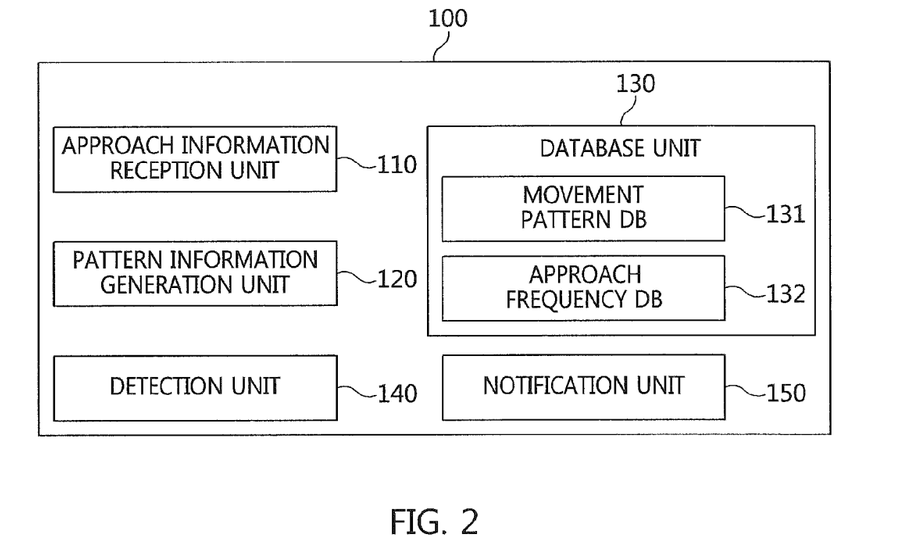
FIG. 2 is a block diagram illustrating a service server according to an embodiment of the present invention.

FIG. 2 is a block diagram illustrating a service server 100 according to an embodiment of the present invention.

As illustrated in FIG. 2, the service server 100 may include an approach information reception unit 110, a pattern information generation unit 120, a detection unit 140, a database unit 130, and a notification unit 150. Although some of the illustrated components are omitted or replaced, there is no difficulty implementing the technical spirit of the present invention.

As described above, the service server 100 may transmit or receive various types of data to or from the plurality of user terminals 200 over a well-known wired/wireless network, may receive approach information from the user terminal 200, and may provide various types of services based on the approach information. The technical spirit of the present invention is based on a configuration in which the service server 100 determines whether the beacon device 300 is abnormal. A detailed description of an embodiment of the present invention in which the service server 100 provides beacon service to the user terminal 200 is omitted.

The approach information reception unit 110 receives approach information related to any one of the plurality of beacon devices 300 from the user terminal 200.

As described above, each of the plurality of beacon devices 300 may be located in a space within a shop. The plurality of beacon devices 300 may be located in a shop. A beacon signal output from the beacon device 300 is based on a well-known wireless communication protocol, such as BLE. The beacon signal is broadcast across a certain coverage area, and the user terminal 200 can receive the beacon signal when entering the corresponding coverage area. The user terminal 200 receives the beacon signal, executes a beacon application, and then transmits the approach information to the service server 100 through the beacon application. In this case, the approach information may include the identification information of the beacon device 300 (for example, the UUID of the beacon device 300), the time at which the beacon signal was received, and the identification information of the user terminal 200.

The service server 100 may store the identification information of the beacon device 300 with the identification information associated with location information. Accordingly, when the service server 100 receives the approach information from the user terminal 200 via the approach information reception unit 110, the service server 100 may estimate the current location information of the user terminal 200 within an error range of about several meters.

Meanwhile, when the approach information reception unit 110 receives the approach information, the approach information is accumulated and stored in the database unit 130, as described below. The approach information may be classified for each user terminal 200, for each beacon device 300, and for each group of user terminals 200 (for each group based on age, gender, preferred service or the like), and then may be stored in the database unit 130.

The pattern information generation unit 120 generates information about a pattern in which a plurality of user terminals 200 approaches a plurality of beacon devices 300 based on a plurality of pieces of approach information received from the plurality of user terminals 200. In this case, the pattern information may include a pattern in which the user terminals 200 sequentially approach the beacon devices 300, that is, a pattern of routes along which users frequently move. In another embodiment of the present invention, the pattern information may include a pattern of the frequencies at which the user terminals 200 approach the beacon devices 300, that is, a pattern of the frequencies at which the user terminals 200 approach the coverage areas of the beacon devices 300. Specific examples of the pattern information are described in detail below with reference to FIGS. 3A, 3B and 4.

The pattern information generation unit 120 may generate a single piece of pattern information for each type of pattern information, for each user terminal 200, or for each group classified based on the user information of the user terminals 200 with reference to approach information received from all the user terminals 200. Furthermore, the pattern information generation unit 120 may generate the pattern information based on the approach information received in each time span.

When the approach information received by the approach information reception unit 110 has been accumulated and stored in the database unit 130, the pattern information generation unit 120 may generate the pattern information based on the approach information, and may update the pattern information in real time. The pattern information may often change in each time span based on the entry of the user of the user terminal 200 into a shop, the movement of the user in the shop and the removal of the user from the shop.

The database unit 130 accumulates and stores the pattern information generated by the pattern information generation unit 120. As illustrated in FIG. 2, the database unit 130 may include a movement pattern database (DB) 131, and an approach frequency DB 132. In this case, the movement pattern DB 131 may include the information of the beacon devices 300 that each of the user terminals 200 sequentially approaches. The approach frequency DB 132 may include the information about the number of user terminals 200 that approach each of the beacon devices 300 in each time span.

The database unit 130 may classify and store the pattern information for each user terminal 200, for each beacon device 300, and for each group of user terminals 200 (for each group based on age, gender, preferred service or the like).

The detection unit 140 determines whether any one of the plurality of beacon devices 300 is abnormal based on a change in the pattern information generated by the pattern information generation unit 120. As described above, the pattern information is generated through the accumulation of the approach information received from a plurality of user terminals 200. Since the entry of users into a shop and the movement of the users in the shop generally maintain a similar pattern, a large sudden change in the pattern information may indicate that any one of the beacon devices 300 is abnormal.

That is, if the beacon device 300 is abnormal, the frequency at which the user terminal 200 identifies the beacon signal of the corresponding beacon device 300 may decrease due to a reduction in the coverage area of the beacon signal. Accordingly, when the beacon device 300 is abnormal, the frequency at which the approach information related to the corresponding beacon device 300 is received may decrease. If the frequency at which the approach information related to any one of the beacon devices 300 is received changes, the pattern information may also change based on the accumulation of the approach information, and thus the detection unit 140 may determine whether the beacon device 300 is abnormal based on a change in the pattern information.

Meanwhile, the pattern information generated by the pattern information generation unit 120 may be generated with reference to the approach information related to all the user terminals 200, may be generated for each user terminal 200, or may be generated for each group classified based on the user information of the user terminals 200. The detection unit 140 may determine whether the beacon device 300 is abnormal based on a change in each pattern information.

A specific embodiment of the present invention in which the detection unit 140 determines whether any one of the beacon devices 300 is abnormal based on a change in pattern information is described in detail below with reference to FIGS. 3 and 4.

If it is determined that any one of the beacon devices 300 is abnormal based on the results of the detection of the detection unit 140, the notification unit 150 notifies an administrator terminal 400, which manages the abnormal beacon device 300, that the corresponding beacon device 300 is abnormal. The service server 100 may store the identification information of each of the beacon devices 300 in advance with the identification information of each of the beacon devices 300 associated with the identification information of the administrator terminal 400. If the beacon device 300 is abnormal, the notification unit 150 notifies the associated administrator terminal 400 that the beacon device 300 is abnormal. After the administrator terminal 400 has received the notification from the service server 100, the administrator terminal 400 may provide information related to the occurrence of an abnormality in the abnormal beacon device 300 to an administrator through the output of video or audio. Through the provision of the information, the administrator is enabled to check the state of the corresponding beacon device 300 and then take a direct action, such as the replacement of a battery or repair.

Figure 3A:
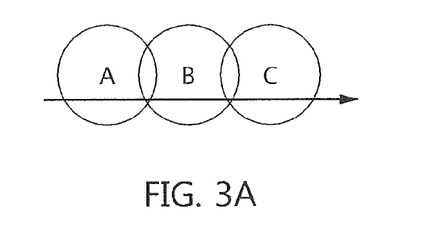
FIGS. 3A and 3B are diagrams illustrating an embodiment of the present invention for determining whether a beacon device is abnormal with reference to the approach pattern of a user terminal.
Figure 3B:
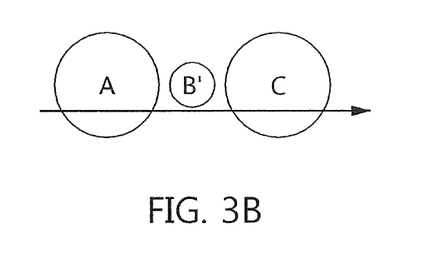

FIGS. 3A and 3B are diagrams illustrating an embodiment of the present invention for determining whether the beacon device 300 is abnormal with reference to the approach pattern of the user terminal 200.

The circles indicated by A, B and C in FIG. 3A are circles that visually illustrate the coverage areas of beacon signals output from respective beacon devices A, B and C. As illustrated in FIG. 3A, it is assumed that each of the beacon devices is located in a shop at regular intervals and the coverage areas of beacon signals are same. In accordance with this embodiment of the present invention, when the density of the beacon devices is high and patterns of the flows of traffic of users are not various, accurate information about whether the beacon device is abnormal can be provided.

In accordance with this embodiment of the present invention, the pattern information generation unit 120 may generate information about a pattern of the beacon devices 300 that each of the user terminals 200 sequentially approaches. For example, when approach information has been accumulated and a pattern of the movement of the user terminal 200 has been analyzed, it may be determined that the rate at which the user terminal 20 approaches the beacon device A and then approaches the beacon device B is 50% and the rate at which the user terminal 20 approaches the beacon device B and then approaches the beacon device C is 30%. This situation corresponds to situation in which users have chiefly moved along a path that extends in the order of A, B and C.

Thereafter, if an abnormality, such as the exhaustion of a battery, occurs in the beacon device B, the coverage area of the beacon device B can be reduced, as illustrated in FIG. 3B. In this case, since the frequency at which the user terminal 200 identifies the beacon signal of the beacon device B decreases due to a reduction in the coverage area, the frequency at which the service server 100 receives approach information related to the beacon device B decreases. Accordingly, the rate at which the user terminal 20 approaches the beacon device A and then approaches the beacon device B may be determined to be a low rate, such as 5%, and the rate at which the user terminal 20 approaches the beacon device B and then approaches the beacon device C may be determined to be a low rate, such as 3%

If it has been determined based on pattern information that the rate at which the user terminal 20 approaches a first one of a plurality of beacon devices 300 and then approaches a second one of the plurality of beacon devices 300 has decreased to or below a predetermined rate, the detection unit 140 may determine that the second beacon device is abnormal. In the above-described example, when the frequency at which the user terminal 20 approaches the beacon device A and then approaches beacon device B has generally decreased from 50% (see FIG. 3A) to 5% (see FIG. 3B) in a specific time span, the detection unit 140 may determine that the beacon device B is abnormal.

A criterion by which the detection unit 140 determines whether a beacon device is abnormal has to be calculated based on the variance of changes in pattern information in each time span. For example, if it is determined that the rate at which the user terminal 20 approaches the first beacon device and then approaches the second beacon device has decreased to or below 1/5 (for example, 10%) of average (for example, 50%) in a specific time span, the detection unit 140 may determine that the second beacon device is abnormal. Furthermore, only a temporary problem may occur in the beacon device 300, or pattern information may change due to a temporary change in a surrounding environment. Accordingly, the detection unit 140 may determine that the beacon device 300 is abnormal only when a change in the pattern information has been identified for a specific or longer time span, for example, 3 or more hours in the case where the pattern information has been generated every hour.

Figure 4:
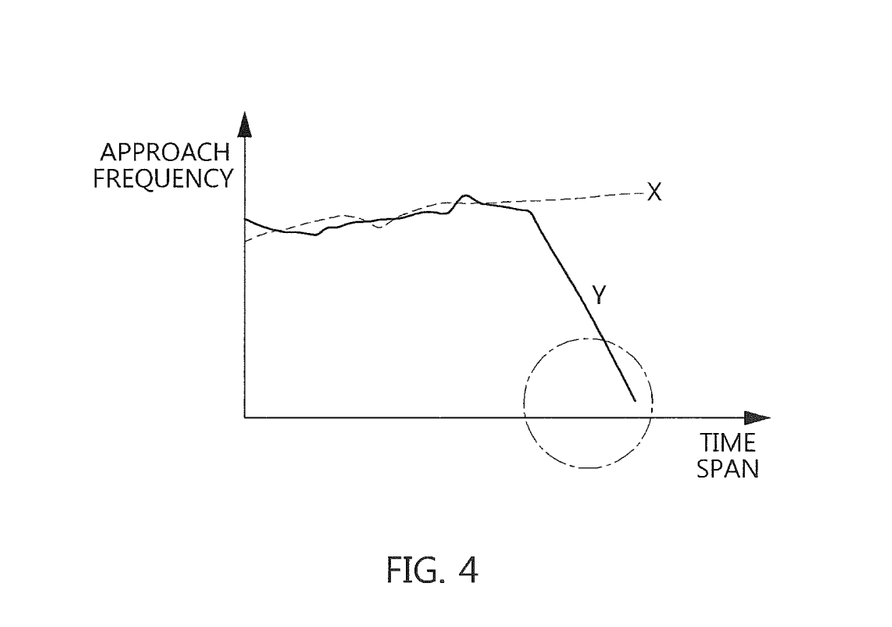
FIG. 4 is a diagram illustrating an embodiment of the present invention for determining whether a beacon device is abnormal with reference to a change in the approach frequency related to the beacon device.

FIG. 4 is a diagram illustrating an embodiment of the present invention for determining whether the beacon device 300 is abnormal with reference to a change in the approach frequency related to the beacon device 300.

FIG. 4 illustrates the approach frequency at which the user terminal 200 has approached the beacon device 300 in each time span. In this case, the X axis represents the time span, and the Y axis represents the approach frequency. The approach frequency may be checked through the accumulation of approach information received from the user terminal 200.

In this embodiment, the pattern information includes the information about the frequency at which the user terminal 200 approaches each of a plurality of beacon devices 300. The detection unit 140 may determine whether the beacon device 300 is abnormal based on a decrease in the frequency at which the user terminal 200 approaches the beacon device 300.

In FIG. 4, X may typically represent the average of approach frequencies for the beacon device A in each time span. Thereafter, if an abnormality occurs in the beacon device A and the coverage area of the beacon device A decreases, the frequency at which the user terminal 200 receives a beacon signal from the beacon device A may suddenly decrease to Y. If the approach frequency in each time span suddenly decreases at a predetermined or higher rate in this way, the detection unit 140 may determine that the beacon device A is abnormal.

In accordance with another embodiment of the present invention, in FIG. 4, Y may represent the real-time approach frequency related to the beacon device B, and X may represent the real-time approach frequency related to the beacon device B having a pattern of approach frequencies similar to a pattern of approach frequencies of the beacon device A. In this case, since the beacon device B is located adjacent to the beacon device A or is located in a shop of a business similar to the business of a shop in which the beacon device A is located, it may be determined that approach patterns of users are very similar to each other. If the approach frequency related to the beacon device A suddenly decreases compared to the approach frequency related to the beacon device B in the same time span, the detection unit 140 may determine that the beacon device A is abnormal.

The specific embodiments of the present invention in which the pattern information generation unit 120 generates the pattern information based on the approach information and the detection unit 140 determines whether any one of the beacon devices 300 is abnormal based on a change in the pattern information have been described with reference to FIGS. 3A, 3B and 4. However, since these embodiments are merely some examples, the spirit of the present invention should not be limited to the embodiments. That is, the present invention may include all implementations in which the service server 100 accumulates and stores a pattern in which the user terminal 200 has approached a plurality of beacon devices 300 and determines whether a beacon device 300 is abnormal based on a predetermined rule when a change in pattern information occurs.

The service server 100 according to the above-described embodiment of the present invention accumulates approach information related to the beacon device 300 received from the user terminal 200, generates a pattern, and then determines whether the beacon device 300 is abnormal based on a change in the pattern, thereby determining whether the beacon device 300 is abnormal through the analysis of pattern information on a server side without directly checking the beacon device 300.

Figure 5:
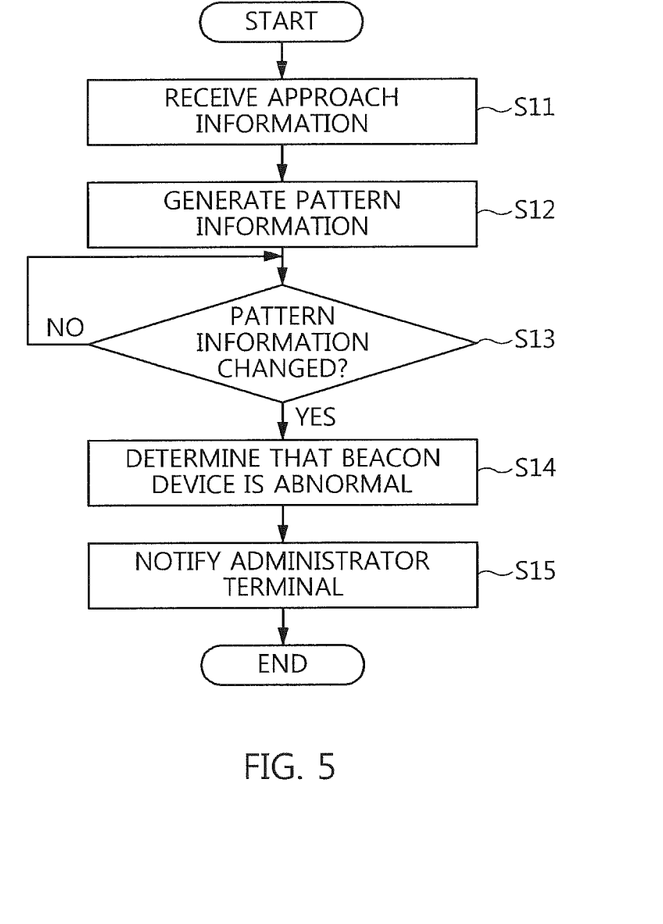
FIG. 5 is a flowchart illustrating a method of determining whether the beacon device is abnormal according to an embodiment of the present invention.

FIG. 5 is a flowchart illustrating a method of determining whether the beacon device 300 is abnormal according to an embodiment of the present invention.

The method illustrated by FIG. 5 is performed by the service server 100 that has been described with reference to FIGS. 2 to 4. Technical features that are identical to the above-described technical features are omitted below.

At step S11, the service server 100 receives approach information related to the beacon device 300 from the user terminal 200 over a network. The approach information is information indicative that the user terminal 200 has received the beacon signal from the corresponding beacon device 300. The approach information may include the identification information of the beacon device 300 (for example, the UUID of the beacon device 300), the time at which the beacon signal was received, and the identification information of the user terminal 200. In this case, the identification number of the user terminal 200 may include at least one of the IMEI of the user terminal 200, the E.164 number of a subscriber, and the membership ID of the beacon application.

When the user terminal 200 has entered the coverage area of the beacon device 300 and has received the beacon signal, the user terminal 200 may execute a beacon-related application and transmit the approach information to the service server 100 over a network.

At step S12, the service server 100 generates pattern information about a pattern in which the user terminal 200 approaches a plurality of beacon devices 300 based on a plurality of pieces of approach information received from a plurality of user terminals 200. In this case, the pattern information may include a pattern in which the user terminal 200 sequentially approaches the beacon device 300, that is, a pattern of routes along which users frequently move. In another embodiment of the present invention, the pattern information may include a pattern of frequencies at which the user terminal 200 approaches the beacon devices 300, that is, a pattern of frequencies at which the user terminal 200 approaches the coverage areas of the beacon devices 300. The examples of the pattern information have been described in detail above with reference to FIGS. 3 and 4.

The service server 100 may generate only a single piece of pattern information for each type of pattern information, for each user terminal 200, or for each group classified based on the user information of the user terminals 200 with reference to the approach information received from all the user terminals 200. Furthermore, the service server 100 may generate the pattern information based on approach information received in each time span.

At step S13, the service server 100 determines whether the generated pattern information has changed. If the generated pattern information has changed at a specific or higher rate, it may be determined that the beacon device 300 is abnormal at step S14.

For example, as described above with reference to FIGS. 3A and 3B, if it is determined that the rate at which the user terminal 20 approaches a first one of a plurality of beacon devices 300 and then approaches a second one of the plurality of beacon devices 300 has decreased to or below a predetermined rate based on the pattern information, it may be determined that the second beacon device is abnormal. In another embodiment, it may be determined that a beacon device whose approach frequency in each time span has decreased at a predetermined or higher rate is abnormal, as described with reference to FIG. 4.

If it is determined that any one of the beacon devices 300 is abnormal, the service server 100 may notify the administrator terminal 400, which manages the abnormal beacon device 300, that the corresponding beacon device 300 is abnormal at step S15. After the administrator terminal 400 has received the notification from the service server 100, the administrator terminal 400 may provide information related to the occurrence of an abnormality in the abnormal beacon device 300 to an administrator through the output of video or audio. Through the provision of this information, the administrator is enabled to check the state of the corresponding beacon device 300 and then take a direct action, such as the replacement of a battery or repair.

In accordance with the method of determining whether a beacon device 300 is abnormal according to this embodiment of the present invention, the service server 100 accumulates approach information related to the beacon device 300 received from the user terminal 200, generates a pattern, and then determines whether the beacon device 300 is abnormal based on a change in the pattern, thereby determining whether the beacon device 300 is abnormal through the analysis of pattern information on a server side without directly checking the beacon device 300.

Meanwhile, the method of determining whether a beacon device is abnormal according to the embodiment of the present invention may be implemented as a computer program that can be executed by various types of operation processing devices. The computer program may include program instructions, data files, and data structures solely or in combination. Examples of the program instructions may include machine code, such as code created by a compiler, and high-level language code executable by a computer using an interpreter. The computer program may be specially designed and configured for the embodiment of the present invention, or may be well known or available to those having ordinary knowledge in the field of computer software.

Furthermore, the program for determining whether a beacon device is abnormal may be recorded on a computer-readable storage medium. Examples of the computer-readable storage medium include all types of hardware devices specially configured to record and execute program instructions, for example, magnetic media such as a hard disk, a floppy disk and magnetic tape, optical media such as compact disk (CD)-read only memory (ROM) and a digital versatile disk (DVD), and magneto-optical media such as a floptical disk, ROM, random access memory (RAM) and flash memory. The hardware devices may be configured to operate as one or more software modules in order to perform the operations of the present invention, and the vice versa.

In accordance with at least some embodiments of the present disclosure, there are provided a service server that accumulates approach information related to the beacon device received from a user terminal, generates a pattern, and then determines whether a beacon device is abnormal based on a change in the pattern, thereby determining whether the beacon device is abnormal through the analysis of pattern information on a server side without directly checking the beacon device, and a method and system for determining whether a beacon device is abnormal using the service serve. Accordingly, since a device to which the technology of the present disclosure is applied has sufficient commercial potential or sales potential and can be practically and explicitly implemented, the present disclosure has industrial applicability.

Although the specific embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A service server for determining whether a beacon device is abnormal, the service server comprising:
an approach information receptor that receives approach information related to any one of a plurality of beacon devices from a user terminal over a network;
a pattern information generator that generates pattern information about a pattern in which the user terminal approaches the plurality of beacon devices, based on a plurality of pieces of approach information received from a plurality of user terminals; and
a detector that determines whether any one of the plurality of beacon devices is abnormal based on a change in the pattern information generated by the pattern information generator,
wherein the pattern information comprises information about a pattern of the beacon devices that the user terminal sequentially approaches,
wherein the detector determines whether any one of the plurality of beacon devices is abnormal based on a change in the pattern of the beacon devices that the user terminal sequentially approaches,
wherein the detector determines that second one of the plurality of beacon devices is abnormal if it is determined based on the pattern information that a rate at which the user terminal approaches first one of the plurality of beacon devices and then approaches the second one has decreased to or below a predetermined rate.

2. The service server of claim 1, wherein:
the pattern information comprises information about a frequency at which the user terminal approaches each of the beacon devices; and
the detector determines whether any one of the plurality of beacon devices is abnormal based on a reduction in a frequency at which the user terminal approaches the corresponding beacon device.

3. The service server of claim 2, wherein:
the pattern information generator generates the pattern information based on an approach frequency related to each of the beacon devices in each time span; and
the detector determines that a beacon device whose approach frequency in each time span has decreased at a predetermined or higher rate is abnormal.

4. The service server of claim 1, wherein the pattern information generator generates the pattern information for groups classified based on user information of the user terminals.

5. The service server of claim 1, further comprising a database that accumulates and stores the pattern information generated by the pattern information generator.

6. The service server of claim 1, further comprising a notificator that notifies an administrator terminal, which manages the abnormal beacon device, that any one of the plurality of beacon devices is abnormal if it is determined that the corresponding beacon device is abnormal.

7. A method of determining whether a beacon device is abnormal, the method comprising:
receiving approach information related to any one of a plurality of beacon devices from a user terminal over a network;
generating pattern information about a pattern in which the user terminal approaches the plurality of beacon devices based on a plurality of pieces of approach information received from a plurality of user terminals; and
determining whether any one of the plurality of beacon devices is abnormal based on a change in the generated pattern information, wherein the pattern information comprises information about a pattern of the beacon devices that the user terminal sequentially approaches, wherein determining whether any one of the beacon devices is abnormal comprises determining whether any one of the plurality of beacon devices is abnormal based on a change in the pattern of the beacon devices that the user terminal sequentially approaches, wherein determining whether any one of the beacon devices is abnormal further comprises determining that second one of the plurality of beacon devices is abnormal if it is determined based on the pattern information that a rate at which the user terminal approaches first one of the plurality of beacon devices and then approaches the second one has decreased to or below a predetermined rate.

8. The method of claim 7, wherein:

the pattern information comprises information about a frequency at which the user terminal approaches each of the beacon devices; and determining whether any one of the plurality of beacon devices is abnormal comprises determining whether any one of the plurality of beacon devices is abnormal based on a reduction in the frequency at which the user terminal approaches the corresponding beacon device.

9. The method of claim 8, wherein:

generating the pattern information comprises generating the pattern information based on the approach frequency related to each of the beacon devices in each time span; and determining whether any one of the plurality of beacon devices is abnormal further comprises determining that a beacon device whose approach frequency in each time span has decreased at a predetermined or higher rate is abnormal.

10. The method of claim 7, further comprising notifying an administrator terminal, which manages the abnormal beacon device, that any one of the beacon devices is abnormal if it is determined that the corresponding device is abnormal.

* * * * *